United States Patent
Vander Lind et al.

(10) Patent No.: US 9,957,042 B1
(45) Date of Patent: May 1, 2018

(54) BIMODAL PROPELLER AIRCRAFT

(71) Applicant: Kitty Hawk Corporation, Mountain View, CA (US)

(72) Inventors: Damon Vander Lind, Oakland, CA (US); Gregory Mainland Horn, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/447,028

(22) Filed: Mar. 1, 2017

(51) Int. Cl.
*B64C 29/00* (2006.01)
*B64C 27/30* (2006.01)
*B64C 11/28* (2006.01)

(52) U.S. Cl.
CPC .......... *B64C 29/0033* (2013.01); *B64C 11/28* (2013.01); *B64C 27/30* (2013.01)

(58) Field of Classification Search
CPC . B64C 29/0033; B64C 29/0075; B64C 11/46; B64C 11/28
See application file for complete search history.

(56) References Cited

U.S. PATENT DOCUMENTS

| 2,478,847 | A | * | 8/1949 | Stuart | B64C 29/0033 244/233 |
|---|---|---|---|---|---|
| 2,936,968 | A | | 5/1960 | Mazzitelli | |
| 3,035,789 | A | * | 5/1962 | Young | B64C 29/0033 244/48 |
| 8,800,912 | B2 | | 8/2014 | Oliver | |
| 9,475,579 | B2 | * | 10/2016 | Fredericks | B64C 25/52 |
| 9,694,911 | B2 | | 7/2017 | Bevirt | |
| 2015/0360775 | A1 | | 12/2015 | Arai | |
| 2016/0031555 | A1 | | 2/2016 | Bevirt | |
| 2017/0197702 | A1 | * | 7/2017 | Alley | B64C 11/28 |

OTHER PUBLICATIONS

Author Unknown, Canadair CL-84, Wikipedia, Jul. 19, 2017, https://en.wikipedia.org/w/index.php?title=Canadair_CL-84 &oldid=789493109.
Author Unknown, NASA GL-10 Greased Lightning, Wikipedia, Jul. 19, 2017, https://en.wikipedia.org/w/index.php?title=NASA_GL-10_Greased_Lightning&oldid=73339.

* cited by examiner

*Primary Examiner* — Brian M O'Hara
(74) *Attorney, Agent, or Firm* — Van Pelt, Yi & James LLP

(57) ABSTRACT

A bimodal propeller aircraft is disclosed. In various embodiments, the aircraft is flown using a cruise propeller and a hover propeller. The hover propeller has one or more folding blades optimized to provide lift to the aircraft in a first flight mode. The cruise propeller is optimized to provide thrust in a second flight mode. In the second flight mode, the one or more folding blades of the hover propeller may remain in a stowed position.

16 Claims, 12 Drawing Sheets

BIMODAL PROPELLER AIRCRAFT

BACKGROUND OF THE INVENTION

An aircraft typically has a set of propellers that are used to fly the aircraft. Propellers may be optimized for different flight conditions, such as hover or cruise. Hover may require powerful propellers that cause drag and inefficiencies during cruise. An aircraft may be desired to be capable of vertical take-off and landing while also being efficient at cruising.

BRIEF DESCRIPTION OF THE DRAWINGS

Various embodiments of the invention are disclosed in the following detailed description and the accompanying drawings.

DETAILED DESCRIPTION

Figure 1A:
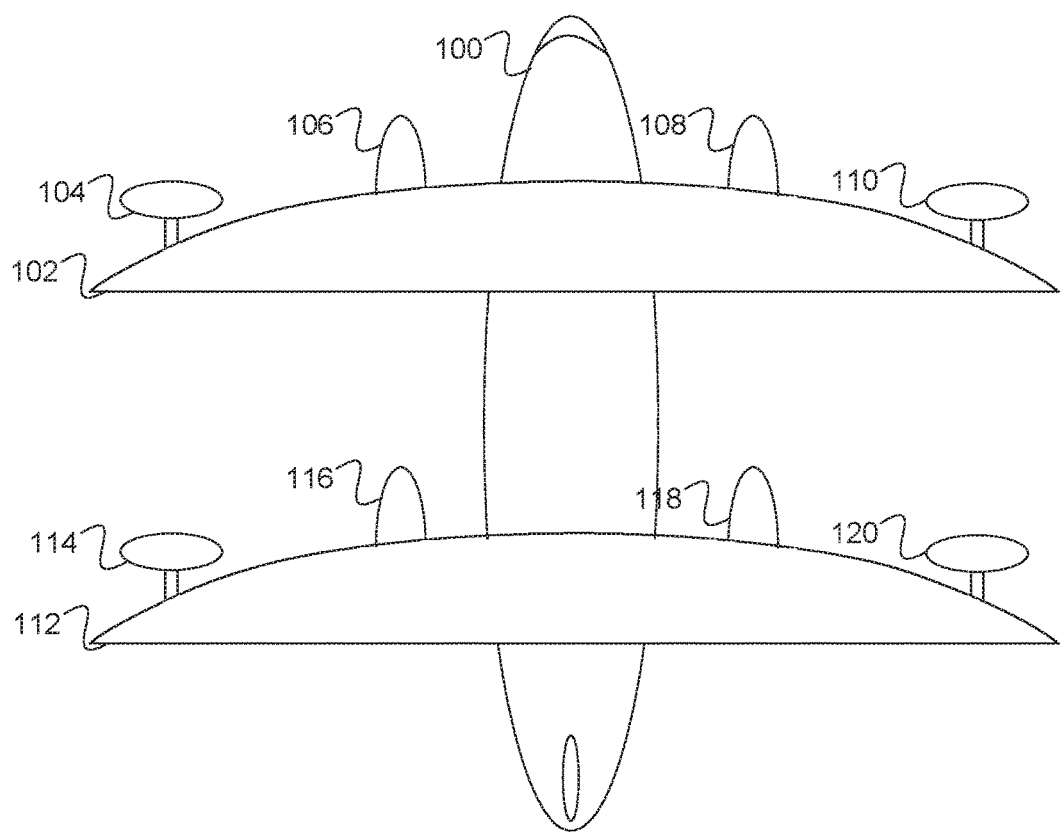
FIG. 1A is a diagram illustrating an embodiment of a bimodal propeller aircraft.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A bimodal propeller aircraft is disclosed. The aircraft comprises a hover propeller comprising one or more folding blades optimized to provide lift to the aircraft in a first flight mode, and a cruise propeller optimized to provide thrust in a second flight mode. The first flight mode may comprise take-off or hover and the second flight mode may comprise forward flight. The hover propeller is configured such that in the second flight mode, the one or more folding blades remain in a stowed position. During take-off and landing, the aircraft may deploy the hover propeller. While the aircraft is cruising, the hover propeller blades may be folded or stowed. In some embodiments, the cruise propeller is engaged during all stages of flight.

A bimodal propeller aircraft may comprise a multi-mode vehicle capable of vertical take-off and landing and also efficient forward flight. Vertical take-off and landing may require greater thrust than the aircraft needs for forward flight. The hover propeller may be used to provide power and thrust required for vertical take-off and landing. In the event the aircraft is engaged in forward flight, the hover propeller's one or more blades may be folded. Folding away the hover propeller's one or more blades may minimize drag and increase range of the aircraft. In some embodiments, the aircraft comprises a flight control system configured to transition the aircraft between the first flight mode and the second flight mode. The cruise propeller may comprise a bistable propeller. The aircraft may comprise tilting wings.

FIG. 1A is a diagram illustrating an embodiment of a bimodal propeller aircraft. In some embodiments, the aircraft comprises two wings, four hover propellers, and four cruise propellers. In the example shown, aircraft 100 comprises front wing 102 and back wing 112. Front wing 102 comprises propellers 104, 106, 108, and 110. Propellers 106 and 108 as shown are on either side of the aircraft's fuselage. Propellers 104 and 110 as shown are positioned at opposite ends of wing 102, near tips of the wing. Back wing 112 comprises propellers 114, 116, 118, and 120. Propellers 116 and 118 as shown are on either side of the aircraft's fuselage. Propellers 114 and 120 as shown are positioned at opposite ends of wing 112, near tips of the wing.

In some embodiments, propellers 106, 108, 116, and 118 comprise folding propellers. The propellers may comprise blades that can be deployed or stored away. Propellers 106, 108, 116, and 118 may be optimized for take-off and landing. Propellers 104, 110, 114, and 120 may be optimized for cruise. Propellers 104, 110, 114, and 120 may comprise bistable propellers that shift between two stable states. In some embodiments, the one or more cruise propellers and the one or more additional hover propellers are positioned in such a way that they contribute a similar moment about a center of mass of the aircraft.

Figure 1B:
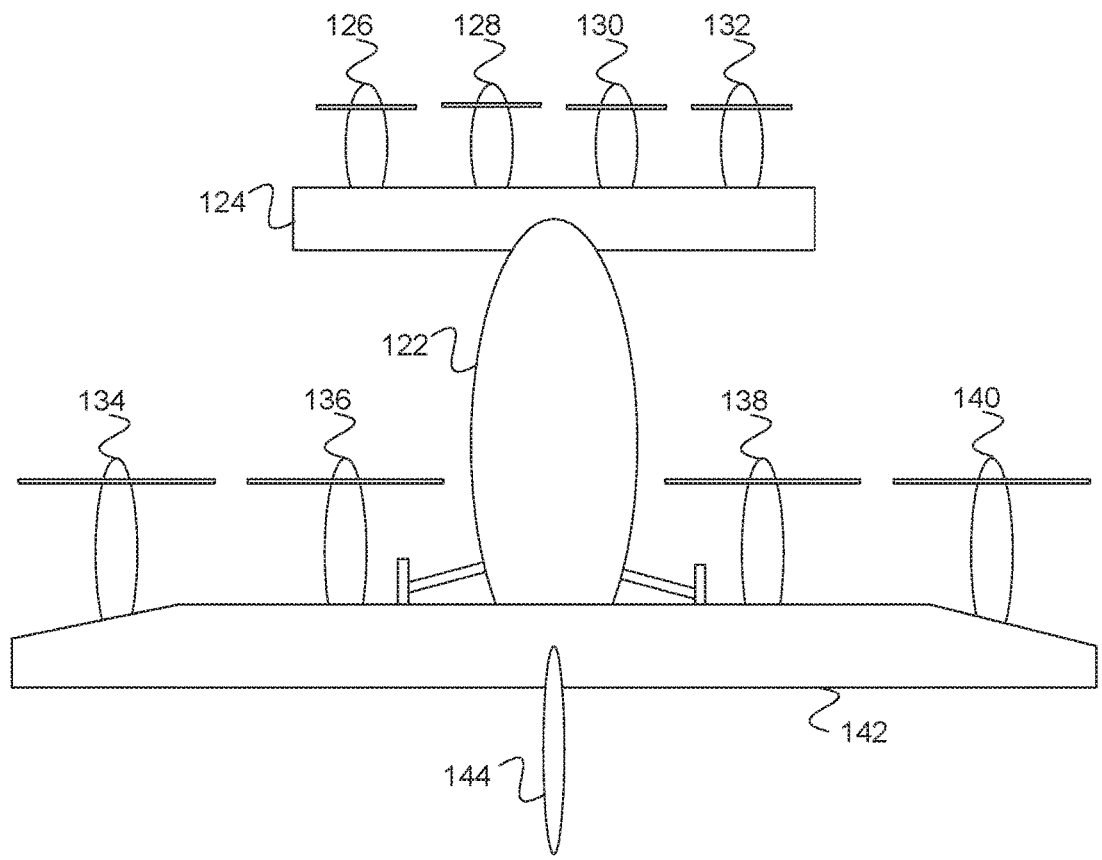
FIG. 1B is a diagram illustrating an embodiment of a bimodal propeller aircraft.

FIG. 1B is a diagram illustrating an embodiment of a bimodal propeller aircraft. In the example shown, fuselage 122 is an oblong shape. Wing 124 is attached at the aircraft's nose. Wing 124 may be attached below the aircraft's center of gravity. Propellers 126, 128, 130, and 132 are attached to wing 124. Propellers 126, 128, 130, and 132 may comprise cruise propellers or bistable propellers. Wing 142 is attached to a tail end of fuselage 122. Wing 142 may be positioned above the aircraft's center of gravity. Propellers 134, 136, 138, and 140 protrude from wing 142. Propellers 134, 136, 138, and 140 may comprise hover propellers. As shown, the hover propellers are installed on longer pods than the cruise propellers. The hover propeller pods may be slimmer, more aerodynamic, or less bulbous in comparison to the cruise propeller pods. Wing 142 as shown is longer than wing 124. Wing 142 comprises tapered ends. In some embodiments, wing 142 is designed to minimize drag. The aircraft further comprises tailpiece 144 and attached wheels.

Figure 1C:
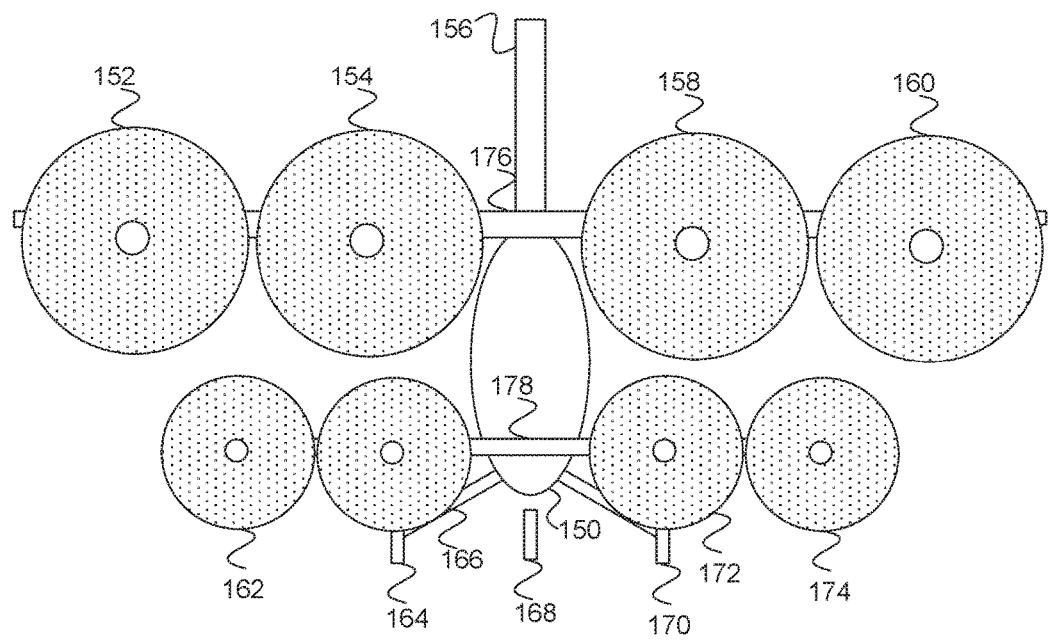
FIG. 1C is a diagram illustrating an embodiment of a bimodal propeller aircraft.

FIG. 1C is a diagram illustrating an embodiment of a bimodal propeller aircraft. FIG. 1C may comprise a front view of the aircraft of FIG. 1B. In the example shown, wings 176 and 178 are attached to fuselage 150. Fuselage 150 rests upon wheels 164, 168, and 170. The wheels may be attached to the fuselage via beams. Tailpiece 156 protrudes from fuselage 150. Wing 176 is attached near the aircraft's tail end and comprises propellers 152, 154, 158, and 160. Propellers 152, 154, 158, and 160 may comprise hover propellers. Wing 178 is shorter than wing 176 and is installed near a front of the aircraft. Wing 178 comprises propellers 162, 164, 172, and 174. Propellers 162, 164, 172, and 174 may comprise cruise propellers. As shown, the hover propellers are larger than the cruise propellers. In some embodiments, the hover and cruise propellers are offset (e.g. a cruise propeller is positioned between two hover propellers).

Figure 2A:
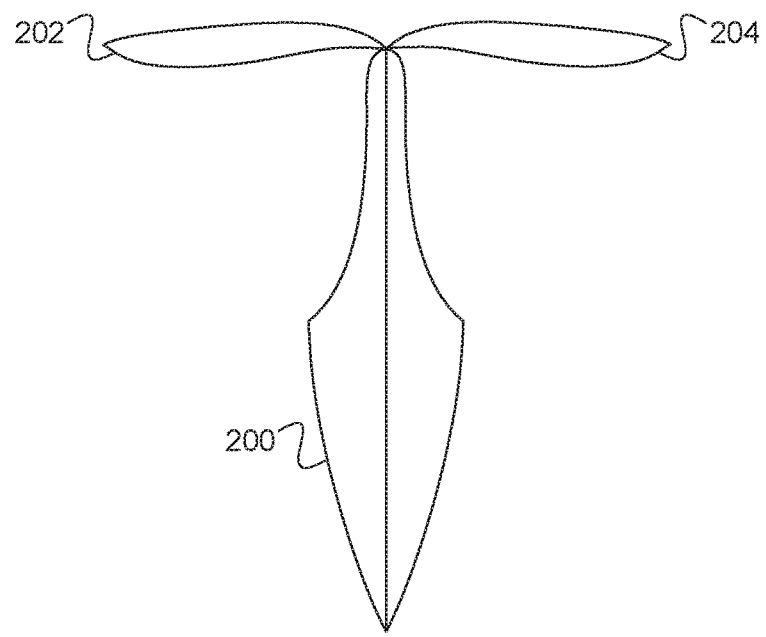
FIG. 2A is a diagram illustrating an embodiment of folding propeller in a deployed position.

FIG. 2A is a diagram illustrating an embodiment of folding propeller in a deployed position. The hover propeller of a bimodal propeller aircraft may comprise a folding propeller. In the example shown, blades 202 and 204 are deployed. Blades 202 and 204 may be rounded. The propeller is attached to pod 200. Pod 200 as shown is a convex shape. Pod 200 may comprise a molded shape that the propeller blades fit into. The pod as shown comprises two concave depressions. In some embodiments, the pod comprises a depression for each blade present. The depression may be shaped according to a corresponding blade's curvature. In some embodiments, a folding propeller comprises two, three, or any appropriate number of blades. Pod 200 may comprise a motor pile-on, wherein a motor that powers the propeller is stored.

Figure 2B:
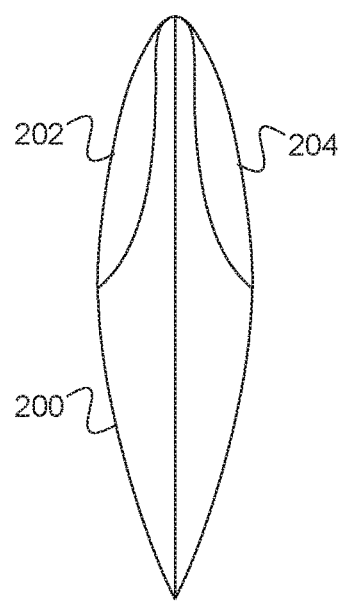
FIG. 2B is a diagram illustrating an embodiment of folding propeller in a folded position.

FIG. 2B is a diagram illustrating an embodiment of folding propeller in a folded position. In the example shown, blade 202 and blade 204 are folded in. The blades as shown are folded into pod 200. As shown, blades 202 and 204 are rounded such that in a folded or stowed position, the propeller and the pod create a smooth convex shape. As shown, the pod with the propeller folded in creates a smooth surface without protruding edges.

In some embodiments, depressions in the pod and blades of the hover propeller comprise magnets. The magnets may attract each other. The magnets may allow the blades to maintain a secure position when they are folded in. The magnets may prevent wind from flapping the blades or moving the blades' positions.

In some embodiments, the hover propeller comprises multiple motor controls that each drive a portion of the propeller. The multiple controls may provide redundancy and efficiency. For example, the propeller may comprise two motor controls that each drive half the propeller. Each motor control may have half of the propeller's coils connected to it. In the event one motor controller was compromised, the other motor controller would continue driving the propeller. In some embodiments, more than half of the original thrust is provided in the event that one motor controller fails. Redundant architecture of the propeller may lower the chance of mechanical failure. Redundant design may allow a low number, such as four, hover propellers to be used in a bimodal propeller aircraft. In some embodiments, a bimodal propeller aircraft is a compact or small form-factor aircraft.

Figure 3A:
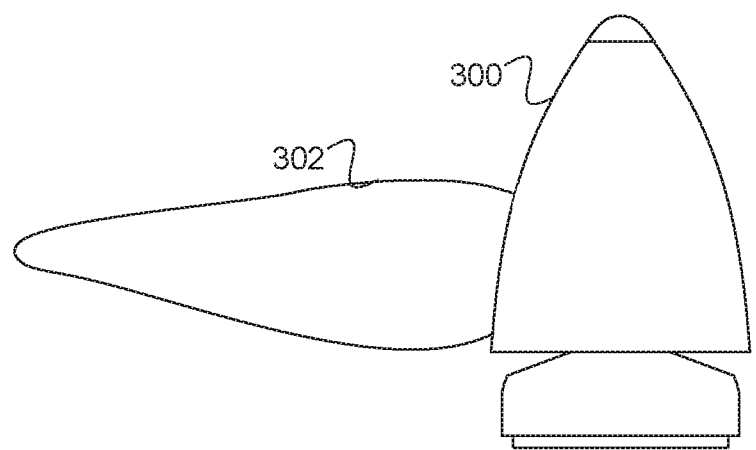
FIG. 3A is a diagram illustrating an embodiment of a cruise propeller.

FIG. 3A is a diagram illustrating an embodiment of a cruise propeller. Propeller 300 as shown comprises blade 302. In some embodiments, a cruise propeller may comprise a high solidity propeller. The cruise propeller may comprise a high pitch propeller. The cruise propeller may be smaller than the hover propeller. The cruise propeller may be optimized to minimize noise during cruise.

Figure 3B:
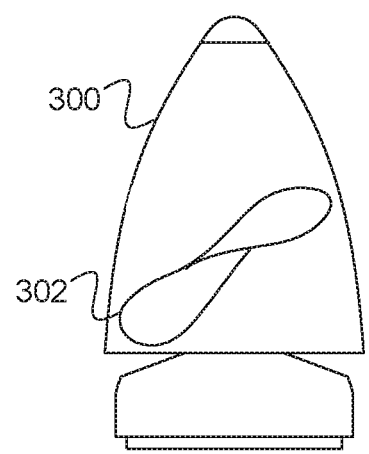
FIG. 3B is a diagram illustrating an embodiment of a cruise propeller.

FIG. 3B is a diagram illustrating an embodiment of a cruise propeller. A cross section of blade 302 is shown. Blade 302 is curved and is attached to propeller 200 at a shallow angle from horizontal. The blade may be attached at an optimal angle of attack for cruise.

Figure 4A:
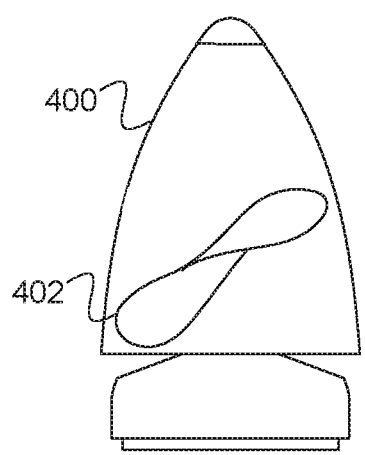
FIG. 4A is a diagram illustrating an embodiment of a bistable propeller.

FIG. 4A is a diagram illustrating an embodiment of a bistable propeller. In the example shown, propeller 400 comprises blade 402. Propeller 400 may be mechanically stable in two or more different positions depending on a direction of rotation in which the propeller is rotated or a history of torque commands. One position may be optimized for cruise while another position is optimized for hover. The position as shown may be optimized for cruise. The propeller may be in one position or another depending on conditions present. For example, the propeller may initially set in a position optimal for hover (e.g. the angle of attack is optimal for hover). As the aircraft changes to forward flight, the blade may move to a second stable position with a different angle of attack. As shown, blade 402 is angled and is not parallel with the propeller's base.

Figure 4B:
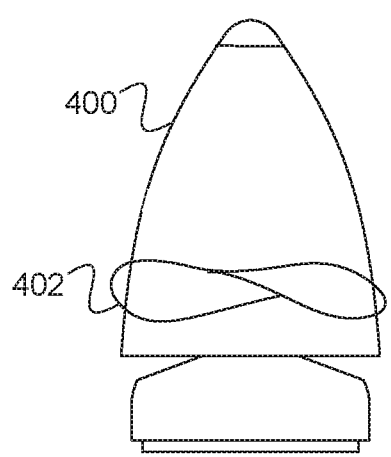
FIG. 4B is a diagram illustrating an embodiment of a bistable propeller.

FIG. 4B is a diagram illustrating an embodiment of a bistable propeller. Bistable propeller 400 comprises blade 402. Blade 402 is positioned parallel to the propeller's base. FIG. 4A and FIG. 4B may comprise two mechanically stable positions of a bistable propeller. FIG. 4A may comprise a cruise position while FIG. 4B comprises a take-off position.

Figure 5A:
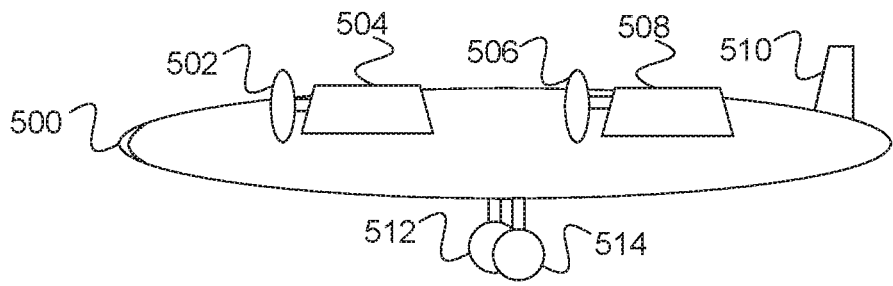
FIG. 5A is a diagram illustrating an embodiment of a bimodal propeller aircraft comprising tilting wings.

FIG. 5A is a diagram illustrating an embodiment of a bimodal propeller aircraft comprising tilting wings. In some embodiments, the bimodal propeller aircraft comprises wings that are able to tilt. In the example shown, aircraft 500 comprises wings 504 and 508. The two wings are parallel to a fuselage of the aircraft. The aircraft comprises wheels 512 and 514 and tailpiece 510. Propeller 502 is attached to wing 504. Propeller 508 is attached to wing 508. Propellers 502 and 508 may comprise cruise propellers or bistable propellers attached near the tips of the wings. Wings 504 and 508 may comprise four propellers each (e.g. two cruise propellers and two hover propellers).

Figure 5B:
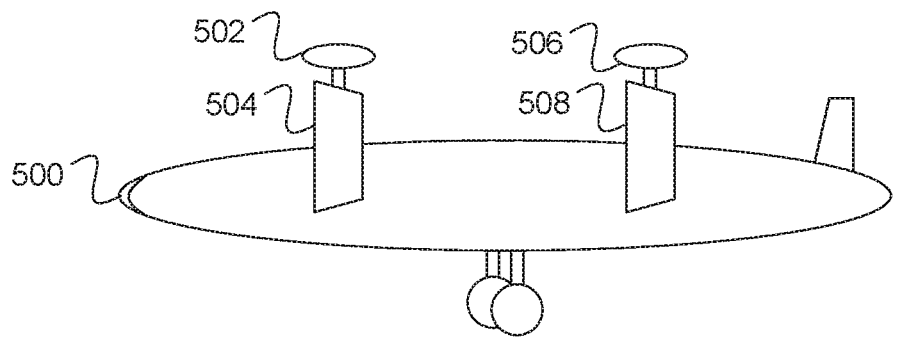
FIG. 5B is a diagram illustrating an embodiment of a bimodal propeller aircraft comprising tilting wings.

FIG. 5B is a diagram illustrating an embodiment of a bimodal propeller aircraft comprising tilting wings. In the example shown, aircraft 500 comprises wings 504 and 508. Wings 504 and 508 are tilted upwards and are perpendicular to aircraft 500's fuselage. In some embodiments, the wings have a range of mobility between 0 to 90 degrees. Propellers 502 and 506 as shown are directed upwards, away from the fuselage of the aircraft. The wings of the aircraft may tilt to aid in slowing down the aircraft during landing. The wings may be tilted in hover mode and remain parallel to the fuselage during cruise.

Figure 6:
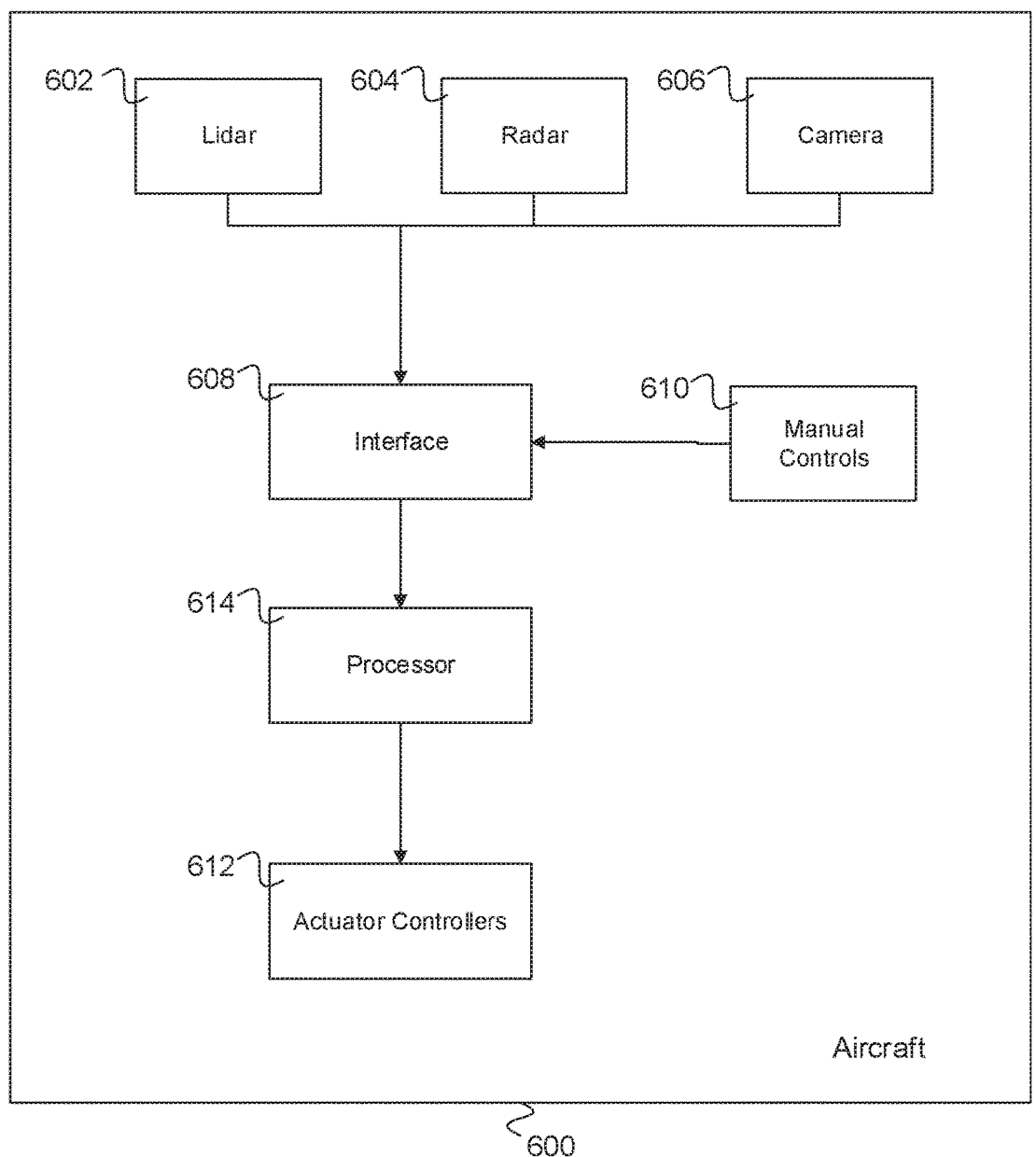
FIG. 6 is a diagram illustrating an embodiment of a bimodal propeller aircraft.

FIG. 6 is a diagram illustrating an embodiment of a bimodal propeller aircraft. In the example shown, aircraft 600 comprises lidar 602, radar 604, camera 606, interface 608, manual controls 610, processor 612, and actuator controllers 612. In some embodiments, sensor data is provided from sensors to interface 608. Sensors may be present on the aircraft. Sensor data may comprise information on altitude, speed, component health, environmental obstacles, or any other appropriate factor. In the example shown, lidar 602, radar 604, and camera 606 provide information via interface 608. The sensors may comprise an accelerometer. Manual controls 610 may comprise controls manipulated by a pilot of the aircraft. The manual controls may be located within the aircraft or the manual controls may be external of the aircraft. For example, the aircraft may be flown from a person on ground. Manual controls 610 may provide information on the pilot's instructions for the aircraft via interface 608.

Processor 614 may receive aircraft information via interface 608. The processor may determine instructions for actuators of the aircraft based on information received. The processor may provide instructions to actuator controllers 612. For example, the processor may receive information that the pilot is causing the aircraft to dive at a maximum allowed angle and camera images show that the aircraft must land with minimal rolling to avoid obstacles ahead. The processor may determine instructions that cause the wings to tilt perpendicular to a fuselage of the aircraft and deploy the hover propellers. Actuator controllers 612 may control the hover propeller, tilting wings, or any other appropriate component.

Figure 7:
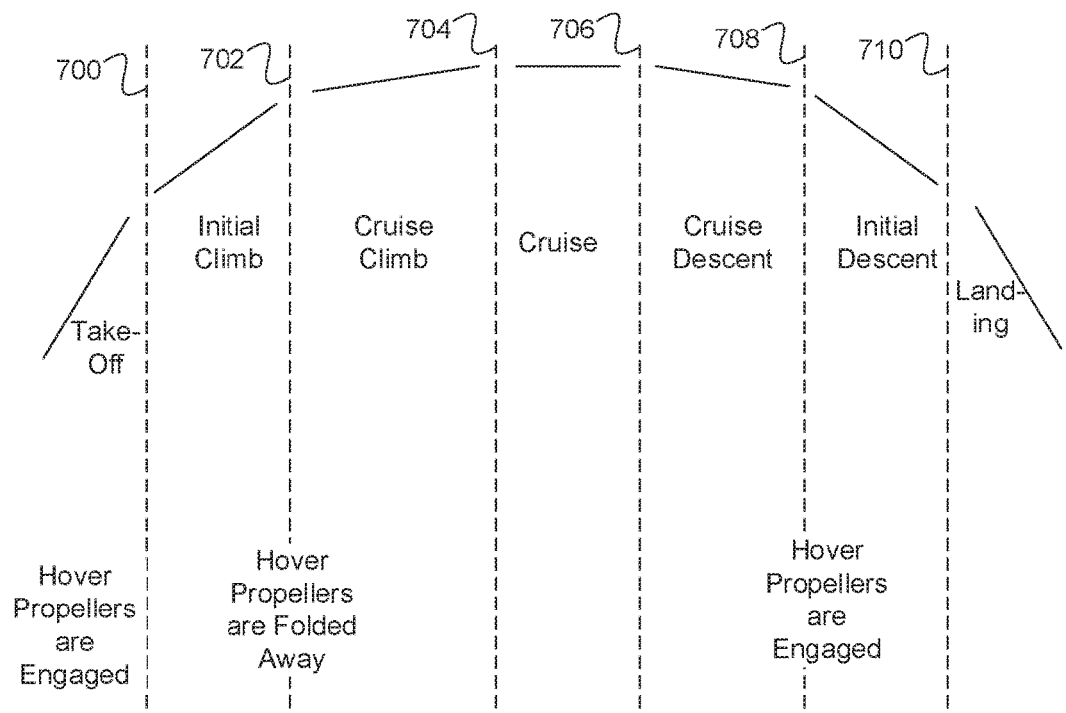
FIG. 7 is a diagram illustrating an embodiment of a bimodal propeller aircraft flight process.

FIG. 7 is a diagram illustrating an embodiment of a bimodal propeller aircraft flight process. The diagram shows different stages of flight of the aircraft. In take-off, the aircraft is angled upwards. The aircraft's one or more hover propellers are engaged. At 700, the aircraft transitions into an initial climb. An initial climb may be less steep than take-off. At 702, the aircraft transitions from the initial climb into cruise climb. At 702, the one or more hover propellers are folded away.

In some embodiments, the propellers are folded into the pods via air resistance. The propellers may be passively controlled. For example, they may be deployed or stowed automatically based on a speed and angle of the aircraft. A spring may fold the propellers back. In some embodiments, the propellers are actively controlled and folded in via a processor. A processor may be required to turn on or turn off power to the propellers. In some embodiments, a processor provides commands to rotate a propeller to a correct position wherein its blades can be folded into depressions or crevices in the pods.

The take-off to cruise climb sequence may occur in a short period of time, such as 10-15 seconds. The hover propellers may be stowed or folded away for a majority of the aircraft's flight time. In some embodiments, folding the hover propellers allows the aircraft to have an optimal laminar air foil for cruise. The propeller wash from deployed hover propellers may cause undesired drag compared to folded hover propellers. Folding the hover propellers may also decrease chances of damage occurring to the hover propellers and endangering the aircraft. For example, the blades of the hover propellers are less susceptible to breakage or impact via birds, debris, or any other obstacle while they are folded away. The folding hover propellers may enable the aircraft to be robust to impact.

In cruise climb, the aircraft may climb at a shallow angle but is mostly in forward flight. At 704, the aircraft transitions from cruise climb to cruise. The aircraft may be completely engaged in forward flight in cruise. At 706, the aircraft transitions from cruise to cruise descent. In cruise descent, the aircraft may shallowly dive. At 708, the aircraft transitions from cruise descent to initial descent. At 708, the one or more hover propellers are engaged. In some embodiments, the one or more hover propellers are engaged either at the beginning or end of initial descent. Initial descent may mark significant diving of the aircraft. At 710, the aircraft transitions from initial descent to landing. At the end of landing, the aircraft touches ground.

Figure 8:
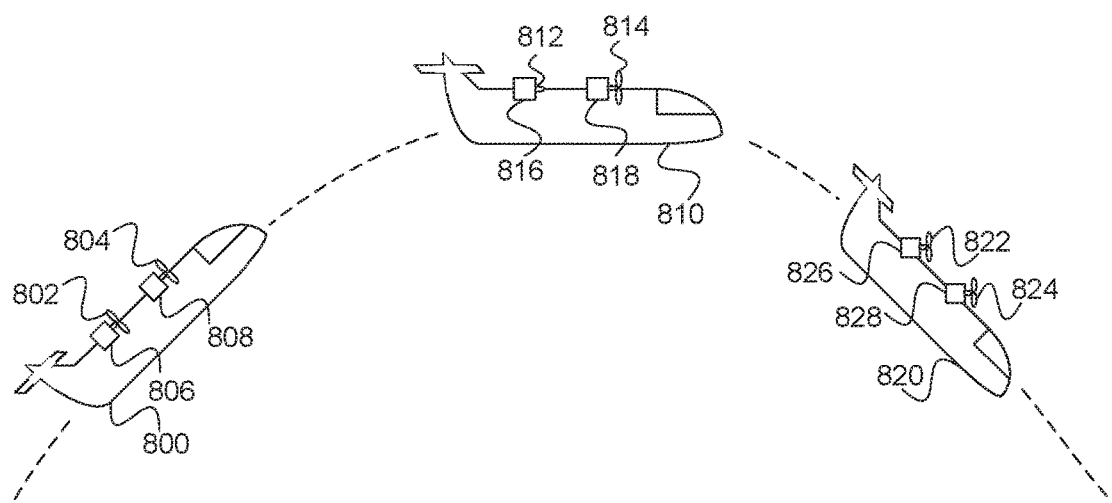
FIG. 8 is a flow diagram illustrating an embodiment of wing positions of a bimodal propeller aircraft during flight.

FIG. 8 is a flow diagram illustrating an embodiment of wing positions of a bimodal propeller aircraft during flight. In the example shown, aircraft 800 is taking off. Its nose is pointed upwards. Wings 806 and 808 are parallel to a fuselage of aircraft 800. Propellers 802 and 804 are attached to wings 806 and 808 respectively. The propellers are pointed towards the nose of the aircraft. The tilt may vary based on the aircraft's desired trajectory. In some embodiments, the aircraft performs a shallow landing without tilting the wings.

Aircraft 810 is in cruise. Wings 816 and 818 are parallel to a fuselage of aircraft 810. Propellers 812 and 814 are attached to wings 816 and 818 respectively. The propellers are pointed towards the nose of the aircraft. The positions of the wings are unchanged from take-off. The aircraft may be gliding. Cruise propellers of the aircraft may be spinning. In some embodiments, the cruise propellers may regenerate or provide power to the hover propellers.

Aircraft 820 is landing. In some embodiments, the wings are parallel to a center line of the aircraft during take-off and tilted relative to a center line of the aircraft during landing. Wings 826 and 828 are tiled forward towards aircraft 820's nose. In some embodiments, the wings tilt from parallel to 90 degrees as the aircraft lands. The wings may be at 90 degrees at the time the aircraft touches ground. Propellers 822 and 824 are attached to wings 826 and 828 respectively. The propellers are tilted at an angle away from the aircraft's fuselage. As the aircraft dives, the wings may be under a power load.

Figure 9:
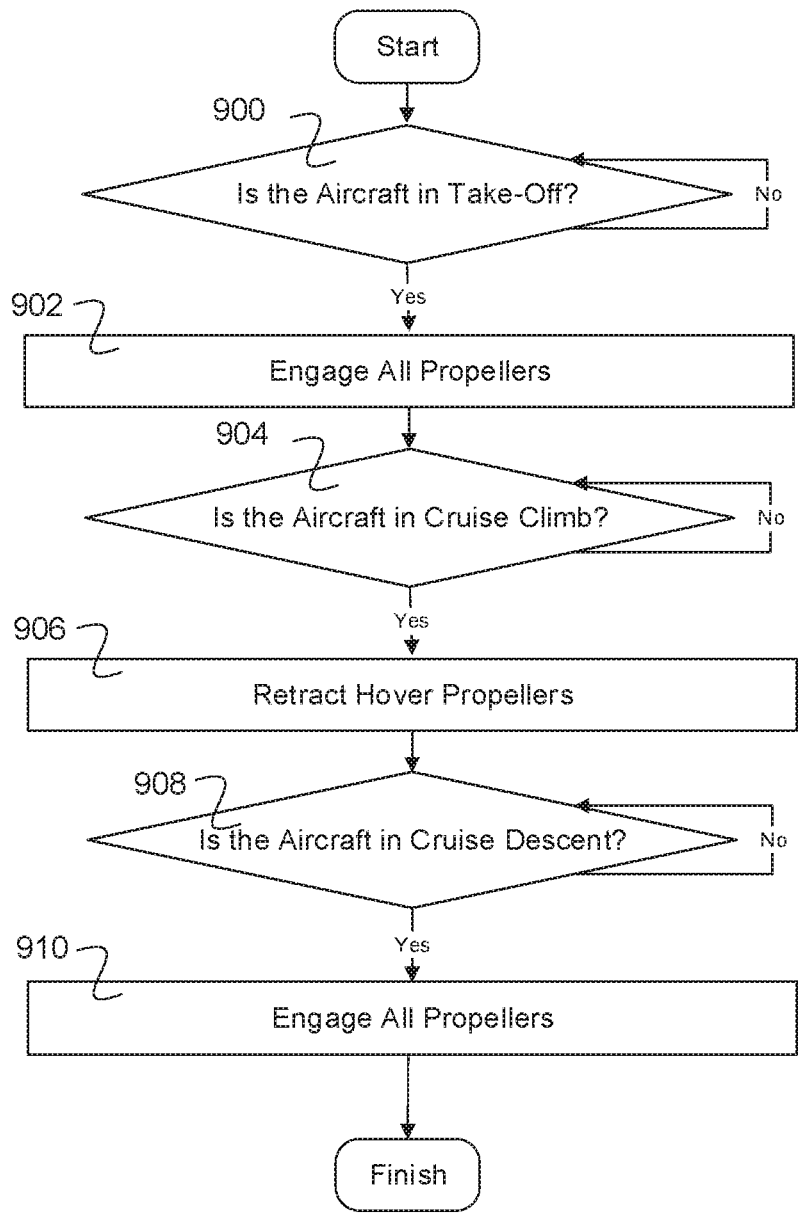
FIG. 9 is a flow diagram illustrating an embodiment of a bimodal propeller aircraft decision process.

FIG. 9 is a flow diagram illustrating an embodiment of a bimodal propeller aircraft decision process. FIG. 9 may illustrate a typical flight sequence of a bimodal propeller aircraft. In 900, it is determined whether the aircraft is in take-off. In the event the aircraft is not determined to be in take-off, 900 is repeated. In some embodiments, the process pauses for a predetermined amount of time before returning to 900. In the event the aircraft is determined to be in take-off, in 902 all propellers are engaged. For example, the hover propellers may be deployed rather than folded. The hover propellers may enable the aircraft to take off vertically and quickly. In 904, it is determined whether the aircraft is in cruise climb. In the event the aircraft is not in cruise climb, the process returns to 904. In some embodiments, the process pauses for a predetermined amount of time before returning to 904. In the event the aircraft is determined to be in cruise climb, in 906 hover propellers are stowed. In 908, it is determined whether the aircraft is in cruise descent. In the event the aircraft is not in cruise descent, the process repeats 908. The process may pause for a predetermined amount of time before returning to 908. In the event the aircraft is in cruise descent, in 910 all propellers are engaged. The process is finished.

Figure 10:
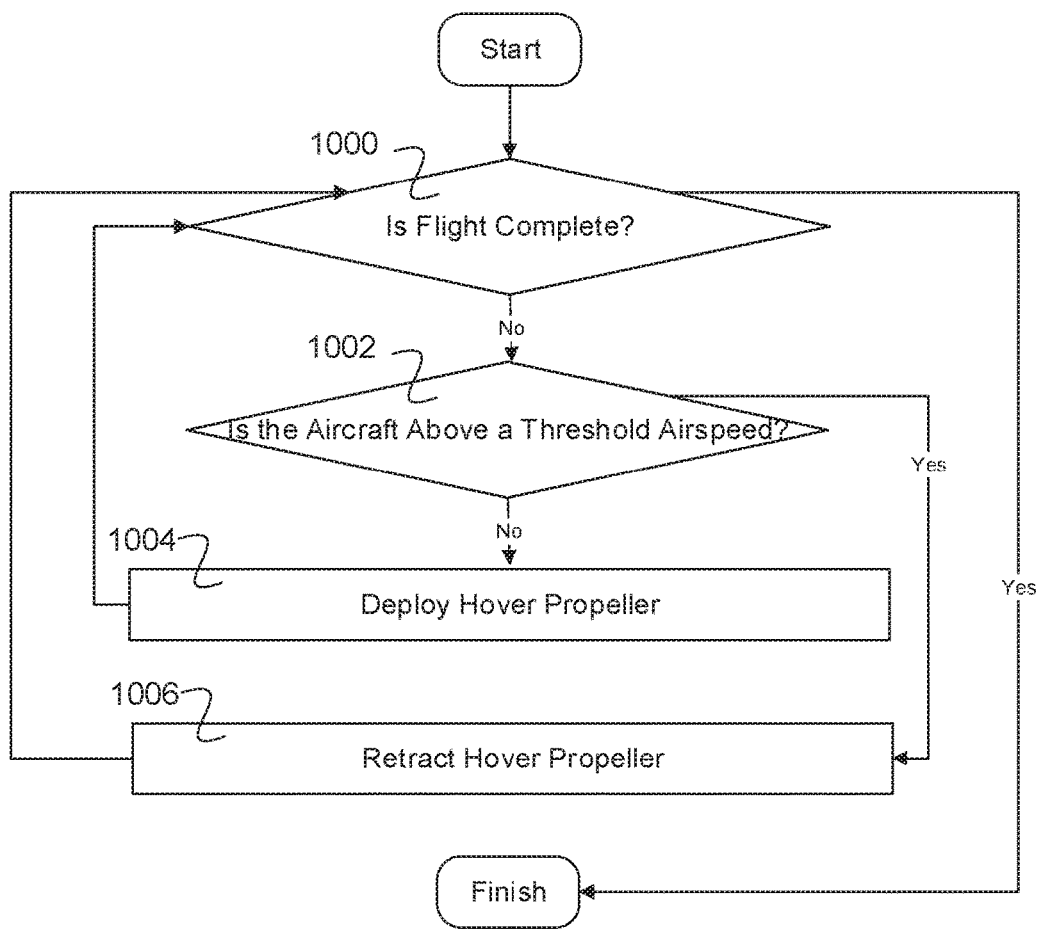
FIG. 10 is a flow diagram illustrating an embodiment of a bimodal propeller aircraft decision process.

FIG. 10 is a flow diagram illustrating an embodiment of a bimodal propeller aircraft decision process. In some embodiments, the hover propellers may be deployed in the event the aircraft requires hover power. The aircraft may require hover power in a variety of circumstances. For example, the aircraft may be required to land quickly or stop before a detected obstacle. The aircraft may be determined to require hover power in the event the aircraft's airspeed falls below a threshold level. The aircraft may be determined to require hover power based on a proxy of airspeed. For example, ground speed, angle of attack, wing angle to ground, or power loading may be used to determine whether the aircraft requires hover power. In some embodiments, hover propellers are turned on when the aircraft's airspeed falls below a threshold level. The hover propellers may improve stall recovery.

In 1000, it is determined whether flight is complete. Determining whether flight is complete may comprise determining whether the aircraft is grounded. In the event flight is complete, the process is finished. In the event flight is not complete, in 1002 it is determined whether the aircraft is above a threshold airspeed. In the event the aircraft is not above the threshold airspeed, in 1004 the hover propeller is deployed. For example, the blades of the hover propeller are folded out from the motor pile-on or pod. In the event the hover propeller is already deployed, no action may be performed. Following 1004, the process returns to 1000. The process may pause for a predetermined amount of time before returning to 1000. In the event the aircraft is above the threshold airspeed, in 1006 the hover propeller is stowed. In the event the hover propeller is already stowed or folded inwards, no action may be taken. Following 1006, the process returns to 1000. The process may pause for a predetermined amount of time before returning to 1000.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
   a hover propeller comprising one or more folding blades optimized to provide lift to the aircraft in a first flight mode;
   a cruise propeller optimized to provide thrust in a second flight mode, wherein the hover propeller is configured such that in the second flight mode, the one or more folding blades remain in a stowed position; and
   wherein the cruise propeller comprises a bistable propeller that is mechanically stable in two or more different positions depending on a direction of rotation in which the propeller is rotated or a history of torque commands.

2. The aircraft of claim 1, wherein the first flight mode comprises take-off or hover.

3. The aircraft of claim 1, wherein the second flight mode comprises forward flight.

4. The aircraft of claim 1, comprising a flight control system configured to transition the aircraft between the first flight mode and the second flight modes.

5. The aircraft of claim 4, wherein the flight control system comprises a processor.

6. The aircraft of claim 1, wherein the hover propeller is attached to a pod comprising one or more depressions based on a shape of the one or more folding blades.

7. The aircraft of claim 6, wherein the one or more depressions comprise magnets that attract corresponding magnets in the one or more folding blades.

8. The aircraft of claim 6, wherein the pod is a smooth convex shape when the one or more folding blades are in the stowed position.

9. The aircraft of claim 1, wherein the hover propeller comprises multiple motor controls that each drive a portion of the propeller.

10. The aircraft of claim 1, wherein the cruise propeller comprises a high solidity propeller.

11. The aircraft of claim 1, further comprising one or more additional cruise propellers and one or more additional hover propellers.

12. The aircraft of claim 11, wherein the cruise propeller, one or more additional cruise propellers, the hover propeller, and one or more additional hover propellers are positioned in such a way that they contribute a similar moment about a center of mass of the aircraft.

13. The aircraft of claim 11, wherein the cruise propeller and one or more additional cruise propellers are positioned on a first wing of the aircraft and the hover propeller and one or more additional hover propellers are positioned on a second wing of the aircraft.

14. The aircraft of claim 1, comprising tilting wings.

15. The aircraft of claim 14, wherein the wings are parallel to a center line of the aircraft during take-off and tilted relative to a center line of the aircraft during landing.

16. The aircraft of claim 1, wherein the aircraft takes off with the cruise propeller and the hover propeller deployed, the hover propeller is stowed during an initial climb stage of flight, and the hover propeller is deployed during landing of the aircraft.

* * * * *